Patented Jan. 6, 1942

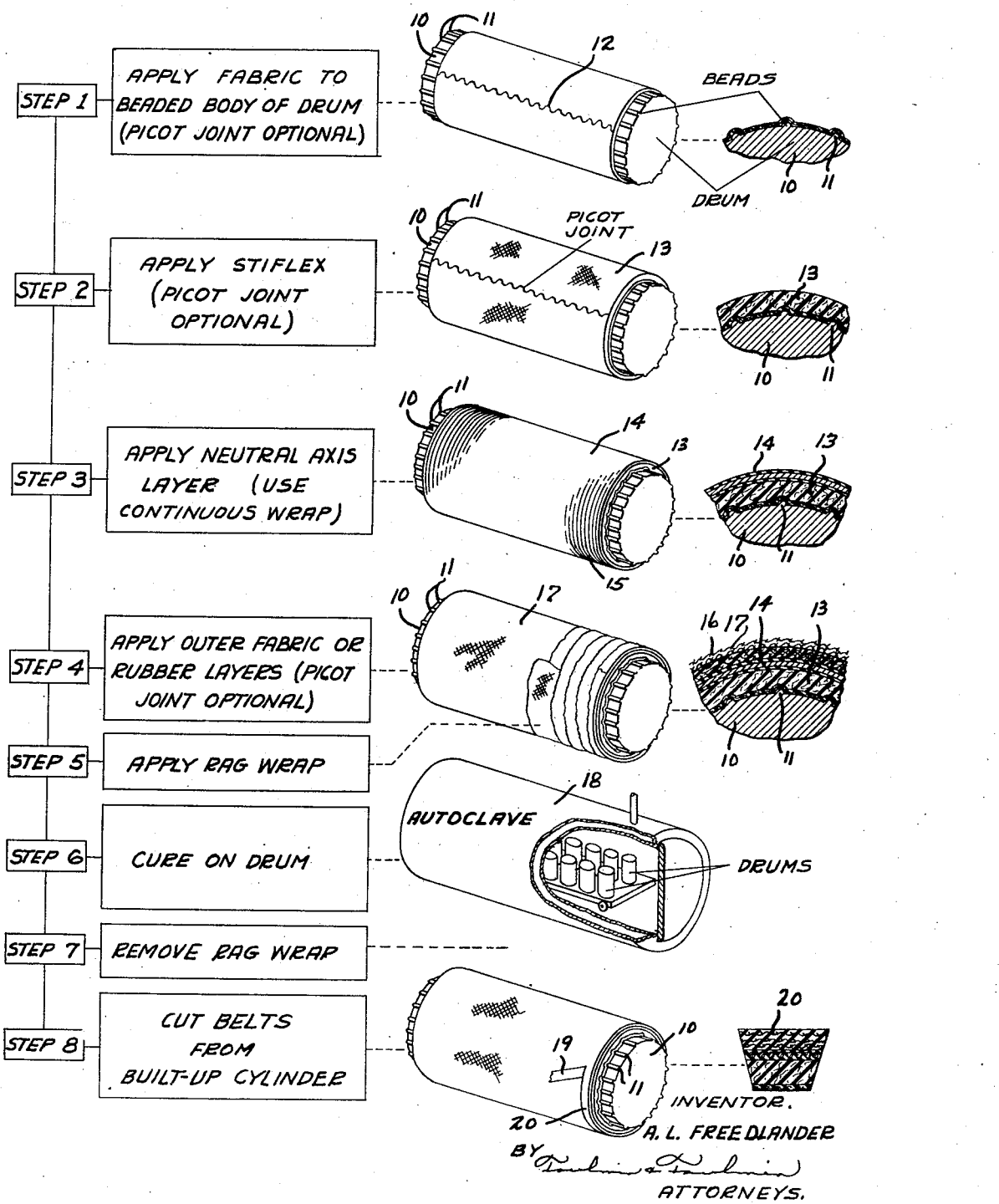

2,268,865

UNITED STATES PATENT OFFICE 2,268,865

METHOD OF MANUFACTURING RAW EDGE BELTS

Abraham L. Freedlander, Dayton, Ohio, assignor to The Dayton Rubber Mfg. Company, Dayton, Ohio, a corporation of Ohio Application August 25, 1939, Serial No. 291,922

8 Claims. (Cl. 154—4)

This invention relates to belts, and more particularly to an improved method of making grooved raw edge belts.

It is an object of this invention to provide a process whereby grooved raw edge belts can be made without preforming the body of the belt.

Another object is to devise a method of making grooved endless belts of simplified manufacture and wherein a substantial reduction in the cost of production is obtained.

Another object is to provide a process whereby the complete belt is formed on the surface of a drum or mandrel having raised portions thereon for forming the grooves in the belt and wherein the belt is cured on the drum and removed to provide the finished product.

Another object is to provide an improved method of making a plurality of endless V-type belts of the raw edge type wherein the belt proper is built upon a drum or mandrel provided with ribs and the belts cured on the drum, after which the individual belts are cut and removed from the drum to provide a plurality of grooved raw edge belts.

In the drawing, there is illustrated in perspective, diagrammatically, the steps in the method of making grooved belts. Accompanying the steps are fragmentary detail views to illustrate the positioning of the laminated layers on the drum or mandrel.

As illustrated in the drawing, my improved method comprises the following steps:

Step 1

In this step a drum or mandrel 10 having suitably spaced ribs or raised portions 11 on the surface is provided, over which a layer of fabric, preferably bias-laid square woven, is positioned. The ends of the fabric layer are picot spliced together as at 12 to provide a joint of uniform layer thickness.

Step 2

Superimposed over the fabric layer is disposed a rubber composition making up the compression section 13 in the body of the belt. Preferably "Stiflex" or other suitable reinforced rubber composition will be used for this purpose. "Stiflex" comprises rubber reinforced with fine parallel transversely disposed textile fibers. It will be appreciated that rubber or synthetic rubber or equivalent resilient thermo-setting compositions may be employed.

Step 3

Superimposed over the compression section is a neutral axis or inextensible layer 14 comprising cords 15 which are embedded in rubber. The cord is preferably wound spirally around the drum over the compression section to form parallel laid continuous cord member which is bonded together with rubber. This provides an inextensible section. In some instances the cords may be woven together and placed around the drum in the form of cord fabric to provide an inextensible neutral axis layer.

Step 4

In this step a rubberized fabric layer, forming the tension section 16, is applied over the neutral axis layer similarly as in positioning the compression layer. The reinforcing fabric embedded in rubber is preferably bias-laid square woven; however, straight-laid square woven fabric may be used if desired. As in the case of the other layers the abutting ends of the rubberized fabric may be interlocked in the form of picot splices so as to provide a continuous layer of uniform thickness.

Step 5

The laminated layers forming the belt proper are now ready to be rag wrapped preparatory to curing or vulcanizing the built-up layers to produce a unitary belt structure. To accomplish this, rag wrap material 17 is tightly wound around the mandrel or drum over the outer rubberized fabric layer forming the belt. In this manner the built-up layer portions forming the body of the belt are compressed against the ribs 11 on the drum forming grooves along the inner surface of the belt body. After the application of the rag wrap material the laminated layers forming the belt proper are ready to be vulcanized.

Step 6

In carrying out the curing or vulcanization the drum or mandrel 10, having the circumferentially wound laminated layers forming the body of the belt disposed thereon, is placed in an autoclave 18 and the whole subjected to vulcanization or equivalent treatment to cure and thoroughly unite the laminated layers together, as illustrated in the drawing at Step 6.

Step 7

After vulcanizing or curing the mandrel and overlaid material forming the body of the belt are removed from the autoclave or curing chamber and the rag wrap 17 removed preparatory to cutting the cured layer into individual belts.

Step 8

The final step is the cutting of the individual belts from the mandrels. This is effected by severing the cured layer at predetermined spacings circumferentially around the mandrel by the use of a knife or set of knives 19 to form the final grooved raw edge belt 20. The angle of cutting the material to form the trapezoid belt 20 may be obviously varied to provide a belt having the desired angularly inclined side walls.

It will be understood that in practicing my process of forming grooved endless raw edge belts the term "rubber" includes synthetic rubber or equivalent synthetic moldable resinous compositions. Further it is likewise appreciated that the number of plies of straight-laid or bias-laid square woven rubberized fabric used in the respective layers forming the belt may be modified to meet widely varying conditions to which the finished belt is to be subjected.

It will be further understood that my invention is not to be limited to the exact procedure described and illustrated but includes such modifications as may be necessary to adapt it to varying conditions and uses.

Having thus fully described my invention, what I claim as new and desire to secure by Letters Patent is:

1. The process of making grooved raw edge V-type belts comprising the steps of (a) superimposing fabricated rubber layers around the surface of a drum or mandrel having transverse ribs spaced circumferentially thereof to build up the belt proper, (b) applying a wrapper over said superimposed layers to compress the same against the surface portions of said mandrel, (c) subjecting said mandrel and circumferentially disposed laminated layer material to vulcanization, and (d) severing the layers circumferentially as a unit around the drum or mandrel to form one or more belts of the desired trapezoid shape having spaced grooves along the inner side of the belt.

2. The process of making grooved endless belts comprising the steps of (a) superimposing fabricated rubber layers upon the surface of a mandrel having ribs on the surface thereof so as to form grooves in the inner surface of the laminated belt body material disposed thereover, (b) forcing the laminated belt body to conform with the surface of said mandrel, (c) subjecting the mandrel and built-up layers compressed thereon to vulcanization to produce an integral body, and (d) thereafter cutting the vulcanized material circumferentially around the drum to form one or more belts of the desired trapezoid shape having transverse grooves along the inner side and removing the same therefrom.

3. In the process of manufacturing grooved raw edge belts, the steps of building up the belt in the form of laminated fabricated rubber layers including a layer of "Stiflex" on the surface of a mandrel having the desired configurations on the surface thereof, compressing the built-up layers against the surface of said mandrel and vulcanizing the same while compressed thereon so as to provide a belt having grooves along the inner surface side of the belt.

4. An improved process of manufacturing grooved raw edge belts comprising the steps of (a) superimposing a bias-laid square woven layer of fabric upon the surface of a drum or mandrel having the desired belt length, (b) superimposing thereover a layer of "Stiflex" forming the compression section of the belt body, (c) disposing thereover a neutral axis inextensible layer comprising inextensible cord material, (d) laying thereover a tension section comprising rubberized fabric, and (e) compressing the overlaid material so as to make it conform to the surface of said mandrel and while thus compressed vulcanizing the same to a unitary belt body whereby grooves are molded in the inner surface side of said belt body.

5. An improved process of manufacturing raw edge belts comprising the steps of (a) applying a layer of fabric to a beaded surface of a mandrel, (b) superimposing over said fabric layer a "Stiflex" layer comprising rubber reinforced with fine parallel transversely disposed textile fibers, (c) disposing thereover a layer of parallel-laid continuous cord, (d) superimposing over said cord a layer of bias-laid square woven rubberized fabric, (e) compressing the superimposed layers firmly against the surface of said mandrel by the application of rag wrap material, and (f) vulcanizing the laminated layers while thus compressed onto said mandrel to thoroughly unite the laminated layers together and form a unitary belt body structure.

6. An improved process of manufacturing raw edge belts comprising the steps of (a) applying a layer of fabric to a beaded surface of a mandrel, (b) superimposing over said fabric layer a "Stiflex" layer comprising rubber reinforced with fine parallel transversely disposed textile fibers, (c) disposing thereover a layer of parallel-laid continuous cord, (d) superimposing over said cord a layer of bias-laid square woven rubberized fabric, (e) compressing the superimposed layers firmly against the surface of said mandrel by the application of rag wrap material, (f) vulcanizing the laminated layers while thus compressed onto said mandrel to thoroughly unite the laminated layers together and form a unitary belt body structure, and (g) removing the rag wrap material after vulcanization and severing the unitary vulcanized belt body circumferentially of the mandrel surface to form a belt of the desired shape and removing the molded grooved raw edge belt from the mandrel.

7. In the process of making grooved raw edge belts, the steps of building up the body of the belt in the form of laminated fabricated rubber layers on a mandrel having the desired surface configurations, compressing the built-up layers against the surface of said mandrel, and vulcanizing the belt body while compressed thereon so as to provide a belt having grooves along the inner surface side of the belt.

8. In a process of making grooved raw edge belts, the steps of building up the belt by superimposing layers of rubberized fabric and "Stiflex" on a mandrel having spaced transverse ribs along the surface, compressing the built-up layers against the ribbed surface of the mandrel to form transverse grooves along the inner side of the belt body, and curing the compressed belt on the mandrel to provide an integral belt having a transverse corrugated inner surface.

ABRAHAM L. FREEDLANDER.